United States Patent
Kim et al.

(10) Patent No.: US 10,993,182 B2
(45) Date of Patent: Apr. 27, 2021

(54) POWER SAVING METHOD THROUGH USER-SPECIFIC SIGNALING

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 59 days.

(21) Appl. No.: 16/087,992

(22) PCT Filed: Mar. 24, 2017

(86) PCT No.: PCT/KR2017/003177
§ 371 (c)(1),
(2) Date: Sep. 24, 2018

(87) PCT Pub. No.: WO2017/164685
PCT Pub. Date: Sep. 28, 2017

(65) Prior Publication Data
US 2019/0116553 A1    Apr. 18, 2019

Related U.S. Application Data

(60) Provisional application No. 62/331,468, filed on May 4, 2016, provisional application No. 62/330,866, filed
(Continued)

(51) Int. Cl.
*H04W 52/02*    (2009.01)
*H04W 72/12*    (2009.01)
(Continued)

(52) U.S. Cl.
CPC ....... *H04W 52/0229* (2013.01); *H04L 5/0037* (2013.01); *H04L 5/0053* (2013.01);
(Continued)

(58) Field of Classification Search
CPC ............ H04W 52/0229; H04W 52/00; H04W 72/1284; H04L 5/0037; H04L 5/0053; H04L 5/0055
See application file for complete search history.

(56) References Cited

U.S. PATENT DOCUMENTS 9,237,521 B2 *   1/2016  Seok ............... H04B 7/0452
10,149,314 B2 *  12/2018  Ghosh ............. H04L 5/0091
(Continued)

FOREIGN PATENT DOCUMENTS

KR  1020110102162  9/2011
KR  1020140037892  3/2014
(Continued)

OTHER PUBLICATIONS

PCT International Application No. PCT/KR2017/003177, Written Opinion of the International Searching Authority dated Jul. 12, 2017, 24 pages.

*Primary Examiner* — Kibrom T Hailu
*Assistant Examiner* — Bailor C. Hsu
(74) *Attorney, Agent, or Firm* — Lee Hong Degerman Kang Waimey

(57) ABSTRACT

Disclosed is a power saving method for a station (STA) in a mobile communication system. On receiving a trigger frame from an access point (AP), a STA transmits a physical protocol data unit (PPDU) to the AP through a multi-user scheme, in response to the trigger frame, wherein the trigger frame includes subsequent scheduling information for each STA. Accordingly, the STA may transit to a doze state on the basis of the subsequent scheduling information for each STA.

11 Claims, 10 Drawing Sheets

Related U.S. Application Data on May 3, 2016, provisional application No. 62/326,075, filed on Apr. 22, 2016, provisional application No. 62/313,802, filed on Mar. 27, 2016, provisional application No. 62/312,886, filed on Mar. 24, 2016.

(51) Int. Cl.
*H04L 5/00* (2006.01)
*H04W 52/00* (2009.01)

(52) U.S. Cl.
CPC ........... *H04L 5/0055* (2013.01); *H04W 52/00* (2013.01); *H04W 72/1284* (2013.01)

(56) References Cited

U.S. PATENT DOCUMENTS

| | | | | |
|---|---|---|---|---|
| 2016/0219510 A1* | 7/2016 | Asterjadhi | ........ | H04W 52/0212 |
| 2016/0302232 A1* | 10/2016 | Ghosh | ............... | H04W 74/0833 |
| 2016/0345349 A1* | 11/2016 | Ferdowsi | .......... | H04W 72/1268 |
| 2016/0360443 A1* | 12/2016 | Hedayat | ............... | H04B 7/0452 |
| 2017/0195954 A1* | 7/2017 | Ghosh | ............... | H04W 28/0221 |
| 2017/0332385 A1* | 11/2017 | Shirali | .................. | H04W 72/10 |
| 2017/0339680 A1* | 11/2017 | Jia | .......................... | H04W 28/02 |
| 2018/0132175 A1* | 5/2018 | Choi | ..................... | H04W 52/02 |

FOREIGN PATENT DOCUMENTS

| | | |
|---|---|---|
| WO | 2015190698 | 12/2015 |
| WO | 2016028124 | 2/2016 |
| WO | 2016032258 | 3/2016 |

\* cited by examiner

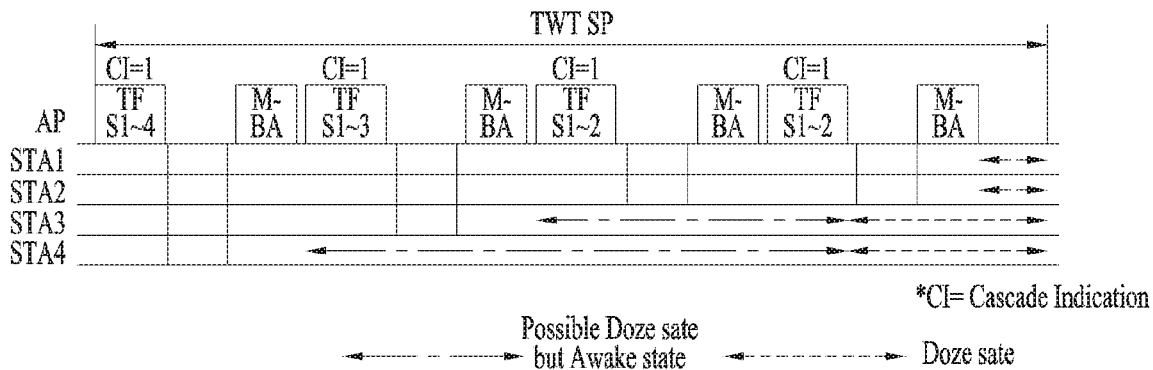

POWER SAVING METHOD THROUGH USER-SPECIFIC SIGNALING

CROSS-REFERENCE TO RELATED APPLICATIONS

This application is the National Stage filing under 35 U.S.C. 371 of International Application No. PCT/KR2017/003177, filed on Mar. 24, 2017, which claims the benefit of U.S. Provisional Application No. 62/312,886, filed on Mar. 24, 2016, 62/313,802, filed on Mar. 27, 2016, 62/326,075, filed on Apr. 22, 2016, 62/330,866, filed on May 3, 2016 and 62/331,468, filed on May 4, 2016, the contents of which are all hereby incorporated by reference herein in their entirety.

TECHNICAL FIELD

The present invention relates to a Wireless Local Area Network (WLAN) system, and more particularly, to efficient power saving methods using subsequent scheduling information per station (STA) in a WLAN system and apparatuses therefor.

BACKGROUND ART

While the proposed power saving method can be applied to various wireless communication systems, the WLAN system is described as an example of the system to which the present invention can be applied.

Standards for a Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE OF THE INVENTION

Technical Task

IEEE 802.11ax supports not only a downlink multi-user access scheme but also an uplink multi-user access scheme to improve the system performance. According to the uplink multi-user access scheme, an STA(s) can receive allocation of uplink resources by receiving a trigger frame from an Access Point (AP) and transmit a UL MU data frame based on the allocated uplink resources. Upon receiving the trigger frame, the STA(s) checks whether there is a subsequent trigger frame based on Cascade Indicator (CI) information in the trigger frame. If there is no subsequent trigger frame, the STA(s) can transit to and maintain a doze state until the next transmission opportunity (TXOP) or Target Wake Time (TWT).

However, since such CI-based Power Saving (PS) is common information for all STAs that participates in the multi-user transmission, it has limitations in terms of efficiency.

In the following description, a method for improving the PS efficiency by providing subsequent scheduling information per user as well as minimizing the signaling overhead will be explained.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these objects and other advantages, in an aspect of the present invention, provided herein is a method for reducing power consumption by a first station (STA) in a mobile communication system. The method may include: receiving a first trigger frame from an Access Point (AP); and transmitting a Physical Protocol Data Unit (PPDU) in response to the first trigger frame to the AP using a multi-user scheme. In this case, the first trigger frame may include subsequent scheduling information per STA, and the first STA may transit to a doze state based on the subsequent scheduling information per STA.

The first trigger frame may further include a cascade indicator indicating whether there is a second trigger frame that follows the first trigger frame, and the cascade indicator may be applied to all STA that transmit PPDUs using the multi-user scheme.

When the subsequent scheduling information per STA indicates that there is no subsequent scheduling for the first STA, the first STA may transit to the doze state even if the cascade indicator indicates that the second trigger frame is present.

When the cascade indicator indicates that there is no second trigger frame, the first STA may transit to the doze state regardless of the subsequent scheduling information per STA.

The first STA may be an STA scheduled by the first trigger frame, and an STA that is not scheduled by the first trigger frame may operate according to the cascade indicator in the first trigger frame.

The first trigger frame may include a Common Control field and a User-specific Control field, and the subsequent scheduling information per may be included in the User-specific Control field.

Based on the subsequent scheduling information per STA, the first STA may transit to the doze state until (1) the end of a corresponding transmission opportunity (TXOP); (2) the end of a corresponding Target Wake Time (TWT) service period; or (3) a next Target Beacon Transmission Time (TBTT).

The first trigger frame may further include information on a doze type indicator, and the doze type indicator may indicate whether the doze state transition based on the subsequent scheduling information per STA should be maintained until (1) the end of the corresponding TXOP; (2) the end of the corresponding TWT service period; or (3) the next TBTT.

The information on the doze type indicator may be included in the Common Control field or User-specific Control field of the first trigger frame.

The first trigger frame may further include information on a time period during which the doze state is maintained, and the first STA may maintain the doze state transition during the time period indicated by the information.

The first STA may transit to the doze state at the time of: (1) transmitting the PPDU regardless of whether an acknowledgement is received in response to the transmitted PPDU; or (2) receiving the acknowledgement in response to the transmitted PPDU.

The first trigger frame may further include a More Data field per STA, and even when the subsequent scheduling information per STA indicates that there is no subsequent scheduling for the first STA, the first STA may not transit to the doze state if the More Data field indicates that there is downlink data to be transmitted to the first STA.

In another aspect of the present invention, provided herein is a method for supporting power saving of one or more stations (STAs) by an Access Point (AP) in a mobile communication system. The method may include: transmitting a first trigger frame to the STAs; and receiving Physical Protocol Data Units (PPDUs) in response to the first trigger frame from the STAs using a multi-user scheme. In this case, the first trigger frame may include subsequent scheduling information per STA and control each of the STAs to transit to a doze state based on the subsequent scheduling information per STA.

In a further aspect of the present invention, provided herein is a first station (STA) for performing a power saving operation in a mobile communication system. The first STA may include: a transceiver configured to receive a first trigger frame from an Access Point (AP); and a processor configured to process the first trigger frame and control the transceiver to transmit a Physical Protocol Data Unit (PPDU) in response to the first trigger frame to the AP using a multi-user scheme. In this case, the first trigger frame may include subsequent scheduling information per STA, and the processor may be configured to transit to a doze state based on the subsequent scheduling information per STA.

In a still further aspect of the present invention, provided herein is an Access Point (AP) for supporting power saving of one or more stations (STAs) in a mobile communication system. The AP may include: a transceiver configured to transmit a first trigger frame to the STAs and receive Physical Protocol Data Units (PPDUs) in response to the first trigger frame from the STAs using a multi-user scheme; and a processor configured to include subsequent scheduling information per STA in the first trigger frame and control each of the STAs to transit to a doze state based on the subsequent scheduling information per STA.

Advantageous Effects

According to the present invention, it is possible to maximize the PS efficiency by providing subsequent scheduling information per user while minimizing the signaling overhead.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

FIG. 2 is a diagram for explaining a power saving method in UL MU transmission.

FIGS. 3 to 5 are diagrams for explaining trigger frame formats used in an HE system.

FIG. 12 is a diagram for explaining a method of using the More DL Data field according to an embodiment of the present invention.

FIG. 13 is a diagram for explaining a power saving method for an unassociated STA according to an embodiment of the present invention.

BEST MODE FOR INVENTION

Hereinafter, exemplary embodiments of the present invention will be described in detail with reference to the accompanying drawings. It is to be understood that the detailed description which will be disclosed along with the accompanying drawings is intended to describe the exemplary embodiments of the present invention, and is not intended to describe a unique embodiment which the present invention can be carried out. In addition, the detailed description includes specific details for the purpose of providing a thorough understanding of the present invention. However, it will be apparent to those skilled in the art that the present invention can be practiced without the specific details.

Figure 1:
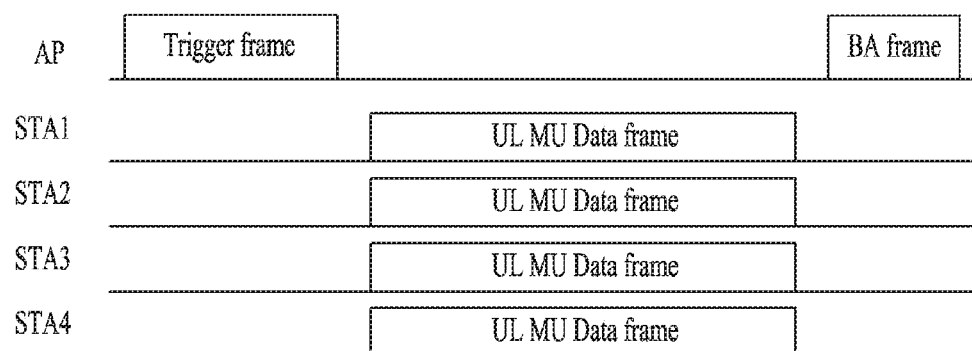
FIG. 1 is a diagram for explaining a UL MU transmission situation to which the present invention is applicable.

FIG. 1 is a diagram for explaining a UL MU transmission situation to which the present invention is applicable.

A UL MU transmission scheme may be used in an 802.11ax system as described above and may be initialized when an AP transmits a trigger frame to a plurality of STAs (e.g., STA 1 to STA 4) as illustrated in FIG. 1. The trigger frame may include UL MU allocation information (e.g. resource location and size, STA IDs, an MCS, and an MU type (MIMO, OFDMA, etc.)). Specific examples of information transmitted in the trigger frame may be as follows.

TABLE 1

Duration of a UL MU frame
Number of allocation (N)
Each allocation's Information
   SU/MU
   AID (for MU, as many AIDs as the number of STAs are additionally included.)
   Power adjustment
   Tone(/Resource) allocation information (e.g., bitmap)
   MCS
   Nsts
   STBC
   Coding
   Beamformed
   Etc.

Meanwhile, as illustrated in FIG. 1, the AP may obtain a TXOP for transmitting the trigger frame via a contention procedure in order to access a medium. The STAs may transmit UL data frames with a format indicated by the AP after an SIFS of the trigger frame. Thereafter, the AP may transmit acknowledgements in response to the UL MU data frames in Block ACK (BA) frames. In this case, the AP may transmit the acknowledgements in various ways such as individual ACK, Multi-STA BA (M-BA), and the like as well as BA.

FIG. 2 is a diagram for explaining a power saving method in UL MU transmission.

In an HE system, a Cascade Indicator (CI) may be included in a trigger frame for PS operation of STAs performing UL multiple access. If CI=1, it means that subsequent trigger frames will be transmitted. On the contrary, if CI=0, it means that there is no subsequent trigger frame.

As shown in FIG. 2, when a plurality of Trigger Frames (TFs) are transmitted within one TWT Service Period (SP), STAs should maintain the awake state until receiving a TF with CI=0. This can be applied when STA 4 is scheduled by the first TF and STA 3 is scheduled by the first and second TFs as shown in FIG. 2. In other words, all STAs should maintain the awake state until receiving the TF with CI=0. That is, power is consumed in the 'possible doze state but awake state' shown in FIG. 2.

As described above, HE STAs can perform the power saving operation using TF start times included in beacon frames and CIs included in TFs. However, the TF start time or cascade indication is included in a TF for random access, and thus it is applied to all power saving STAs that receive the TF. Thus, the power may be wasted as shown in FIG. 2.

In an embodiment of the present invention, a UL MU TXOP power saving method for reducing power consumption of STAs scheduled by scheduled TFs rather than OFDMA random access is proposed. The method can be used to reduce the power consumption of not only the scheduled STAs but STAs performing the OFDM random access. Before describing the method, a TF to which subsequent scheduling information per individual user can be added will be explained in detail.

FIGS. 3 to 5 are diagrams for explaining trigger frame formats used in an HE system.

FIG. 3 shows the overall structure of a TF, FIG. 4 shows the Common Info field of the TF configuration, and FIG. 5 shows the Per User Info field of the TF configuration.

In FIG. 3, the Duration field indicates the duration of a corresponding TXOP and the RA/TA fields indicates the IDs of transmitting and receiving STAs.

The Length subfield of the Common Info field shown in FIG. 4 may indicate the value of the L-SIG Length field of the HE trigger-based PPDU transmitted in response to the corresponding TF. The CI subfield may indicate whether there is a subsequent TF as described above. The CS Required subfield may indicate whether the STAs, which are identified by the Per User Info field, consider media states and NAVs in order to determine whether to respond and whether the STAs require ED to sense the media. The HE-SIG-A Info subfield may indicate the content of the HE SIG-A field in the HE-trigger-based PPDU response.

The CP and LTE subfields may indicate the types of the CP and HE-LTF of the HE trigger-based PPDU as shown in Table 2 below.

TABLE 2

| CP and LTF field value | Description |
| --- | --- |
| 0 | 2x LTF + 0.8 µs CP |
| 1 | 2x LTF + 1.6 µs CP |
| 2 | 4x LTF + 3.2 µs CP |
| 3-TBD | Reserved |

Meanwhile, the Trigger Type subfield may indicate the type of the corresponding TF as shown in Table 3 below.

TABLE 3

| Trigger Type value | Trigger Type description |
| --- | --- |
| 0 | Basic Trigger |
| 1 | Beamforming Report Poll Trigger |
| 2 | MU-BAR |
| 3 | MU-RTS |
| 4-TBD | Reserved |

The User Identifier subfield of the Per User Info field shown in FIG. 5 indicates the AID of the STA that will transmits an MPDU(s) in response to the corresponding TF. The RU Allocation and Coding Type subfields indicate the resource and coding scheme to be used for the HE trigger-based PPDU response, respectively. The MCS and DCM subfields may respectively indicate whether MCS and DCM will be applied to the HE trigger-based PPDU transmission, and the SS allocation subfield may indicate the spatial streams of the HE Trigger-based PPDU response.

Based on the above-described UL MU transmission structure and TF structure, a method according to an embodiment of the present invention proposes: an STA receives a first TF from an AP; the STA transmits a PPDU to the AP in response to the first TF using a multi-user scheme, wherein the first TF includes subsequent scheduling information per STA; and the first STA transits to a doze state based on the subsequent scheduling formation per STA. In this case, the subsequent scheduling information per STA is different from the above-described CI information applied to all STAs. In addition, from the perspective of the first STA, which is scheduled by the TF, if the subsequent scheduling information per STA indicates that there is no subsequent scheduling for the first STA, it is desirable that the first STA transits to the doze state even through the CI indicates that there is a second subsequent TF.

To this end, it is preferred that when the AP transmits the TF, the AP also transmits the above-described subsequent scheduling information per STA by including it in the Per User Info field. In the following description, the subsequent scheduling information per STA can be interpreted as various concepts such as "Next Scheduling Indication", "No Resource Allocation", "No Scheduling", "More Trigger", "No More Trigger", etc. In the following embodiments, when the subsequent scheduling information per STA is defined as the Next scheduling Indication (NI), the NI can be set to 1 (NI=1) in case there is subsequent scheduling. On the contrary, if there is no subsequent scheduling, the NI can be set to 0 (NI=0).

The NI indicates whether a corresponding STA receives additional scheduling (or resource allocation) in a corresponding TXOP or not. If the NI is set to 1, it indicates that additional resource allocation information for the corresponding STA is included in the next TF. Thus, the STA should maintain the awake state until receiving the next TF (or until the corresponding TXOP expires or the designated TWT SP ends).

If the NI is set to 0, it indicates that additional resource allocation information for the corresponding STA is not included in the next TF. Thus, the STA transmits a UL MU frame in response to the received TF. Upon receiving DL MU ACK from the AP in response to the UL MU frame, the STA enters and maintains the doze state until the corresponding TXOP ends (or until the corresponding TWT SP ends).

Figure 6:
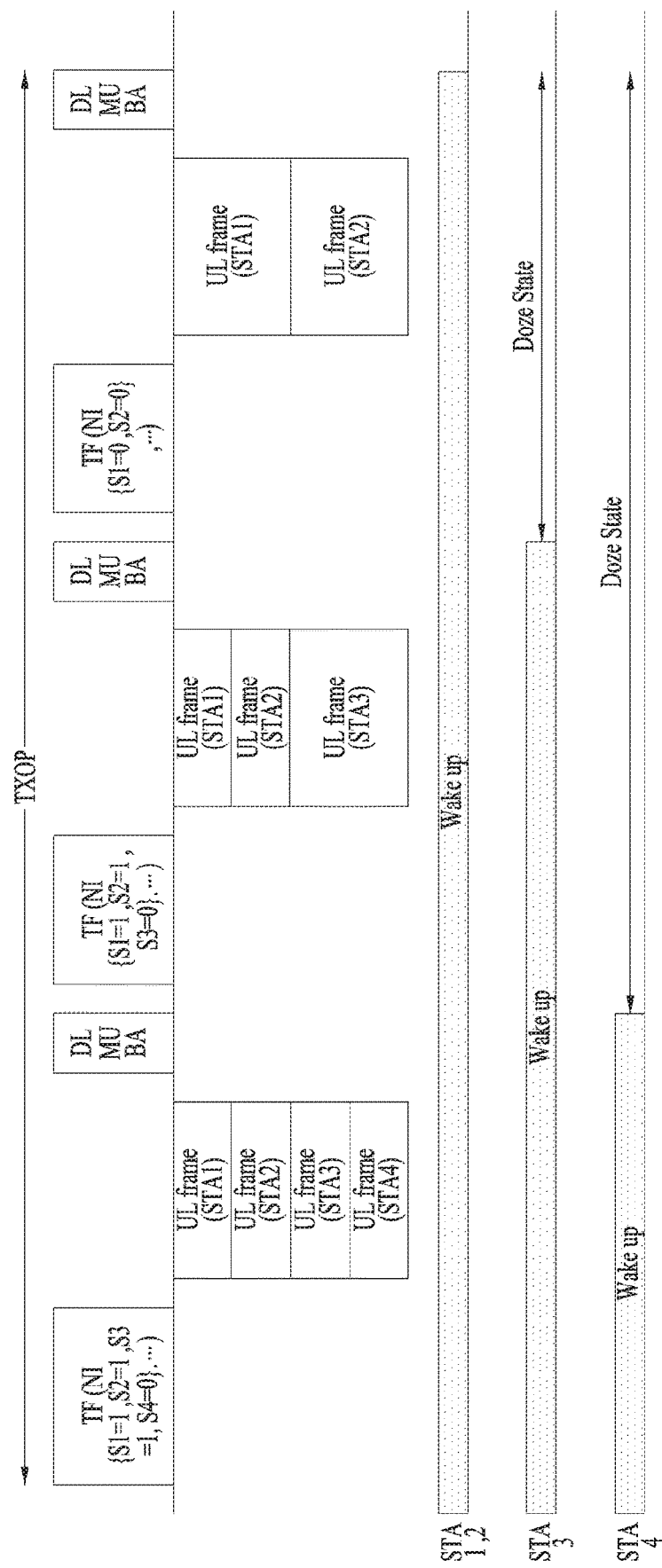
FIG. 6 is a diagram for explaining a method of using NI in TFs according to an embodiment of the present invention.

FIG. 6 is a diagram for explaining a method of using NI in TFs according to an embodiment of the present invention.

In FIG. 6, it is assumed that in the first TF, the NI is set to 1 for STAs 1, 2 and 3 and 0 for STA 4. Thus, STAs 1, 2, and 3 wait for the next TF, whereas STA 4 enters and maintains the doze state until the end of the TXOP after receiving DL MU BA.

In the second TF, since the NI is set to 1 for STAs 1 and 2 and 0 for STA 3, STAs 1 and 2 waits for the next TF, but STA 3 transmits a UL MU frame in an allocated resource region of the TF. After receiving a response (DL MU BA) in response to the UL MU frame, STA 3 enters and maintains the doze state until the remaining TXOP ends. In other words, in this example, NI=0 instructs to enter and maintain the doze state until the end of the remaining TXOP.

Although FIG. 6 assumes that the transition to the doze state is determined based on a TXOP, the present invention is not limited thereto. In particular, the doze state transition can be performed as follows based on a TWT SP.

Figure 7:
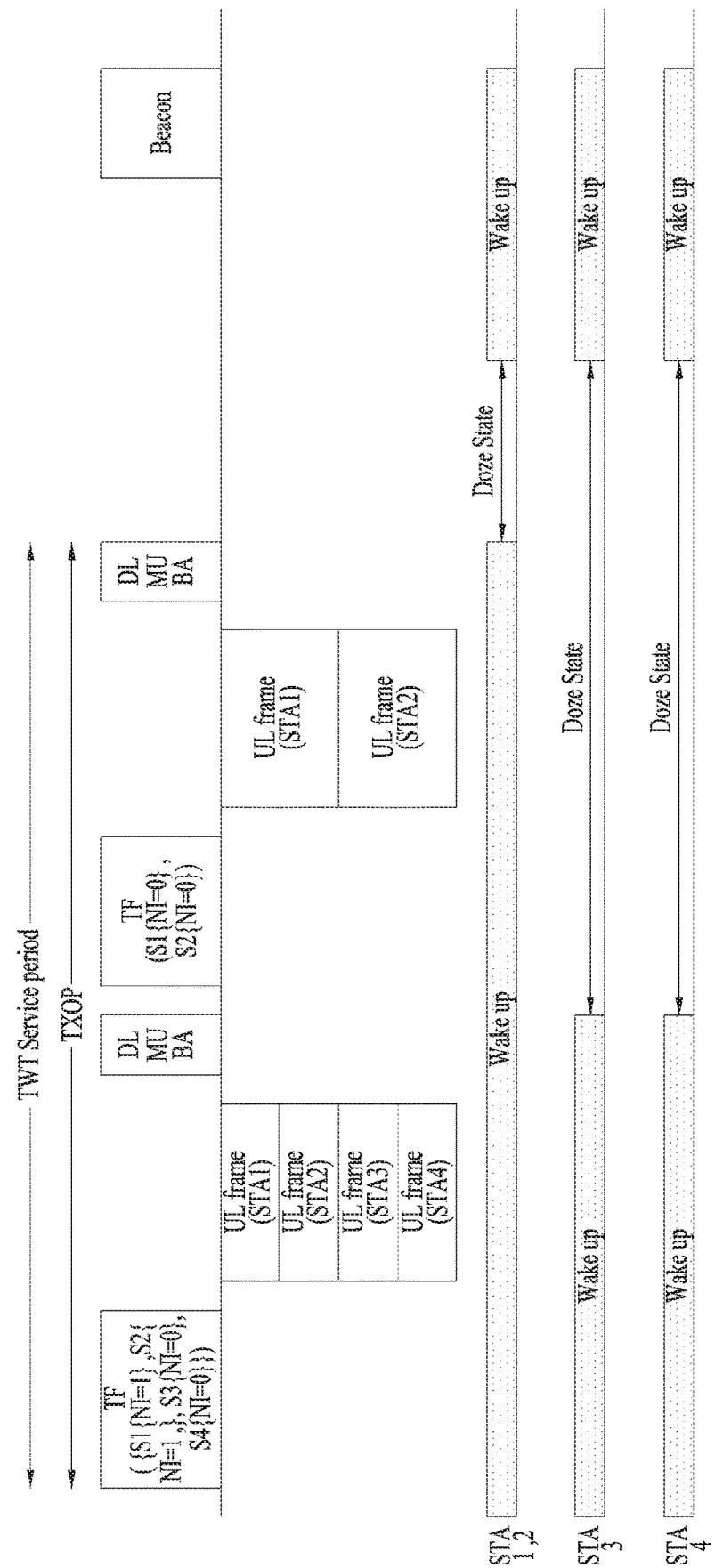
FIG. 7 is a diagram for explaining a method for performing doze state transition based on a TWT SP while using NI in TFs according to an embodiment of the present invention.

FIG. 7 is a diagram for explaining a method for performing the doze state transition based on a TWT SP while using NI in TFs according to an embodiment of the present invention.

Referring to FIG. 7, it can be seen that when STAs 3 and 4 receive the first TF, the NI is set to 0. Thus, STAs 3 and 4 enter and maintain the doze state until the end of the TWT SP after receiving the first DL MU BA from the AP. In addition, it can be seen that when STAs 1 and 2 receive the second TF, the NI is set to 0. Thus, STAs 1 and 2 transmit UL frames and then receive the second DL MU BA. Thereafter, STAs 1 and 2 enter and maintain the doze state until the end of the remaining TWT SP.

That is, in this example, NI=0 instructs to enter and maintain the doze state until the remaining TWT SP ends.

Meanwhile, the doze state transition can be performed based on Next Target Beacon Transmission Time (TBTT) besides the above-described TXOP and TWT SP. That is, if corresponding indication (e.g., NI) is set to 0, a user equipment may enter and maintain the doze state until the Next TBTT.

Figure 8:
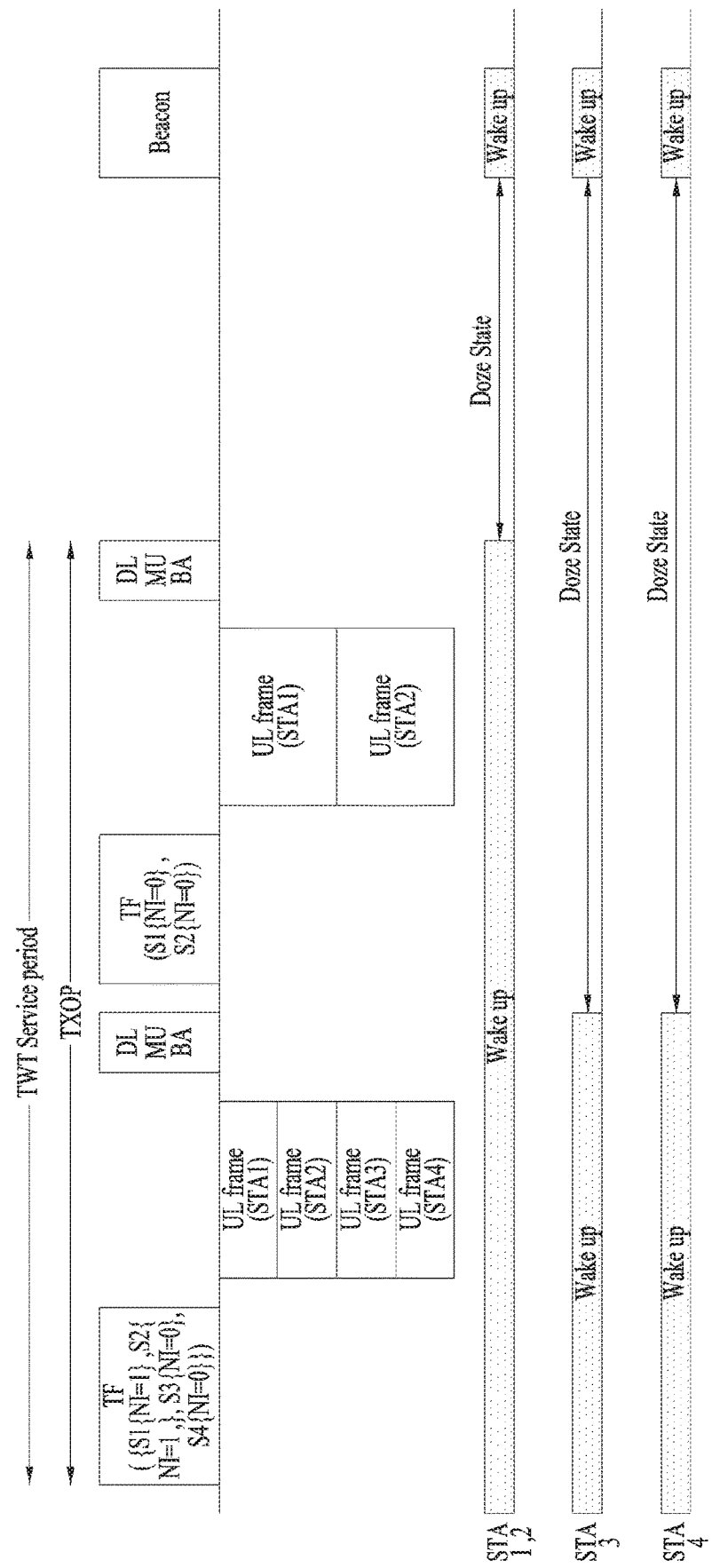
FIG. 8 is a diagram for explaining a method for performing doze state transition based on Next TBTT while using NI in TFs according to an embodiment of the present invention.

FIG. 8 is a diagram for explaining a method for performing the doze state transition based on Next TBTT while using NI in TFs according to an embodiment of the present invention.

Referring to FIG. 8, it can be seen that when STAs 3 and 4 receive the first TF, the NI is set to 0. Thus, STAs 3 and 4 enter and maintain the doze state until receiving a next beacon after receiving the first DL MU BA from the AP. In addition, it can be seen that when STAs 1 and 2 receive the second TF, the NI is set to 0. Thus, after receiving the second DL MU BA, STAs 1 and 2 enter and maintain the doze state until the next beacon is received.

FIGS. 6 to 8 show that the doze state transition is performed based on a TXOP, TWT, and TBTT, respectively. However, according to an embodiment of the present invention, which one of the aforementioned methods will be used to determine the doze state transition can be additionally signaled.

According to an embodiment of the present invention, a TF may include Doze state type Indication (DI). Specifically, when the DI is set to 0 (DI=0), it indicates to enter and maintain the doze state until the end of a TXOP. On the contrary, when the DI is set to 1 (DI=1), it indicates to enter and maintain the doze state until the end of a TWT SP.

Figure 9:
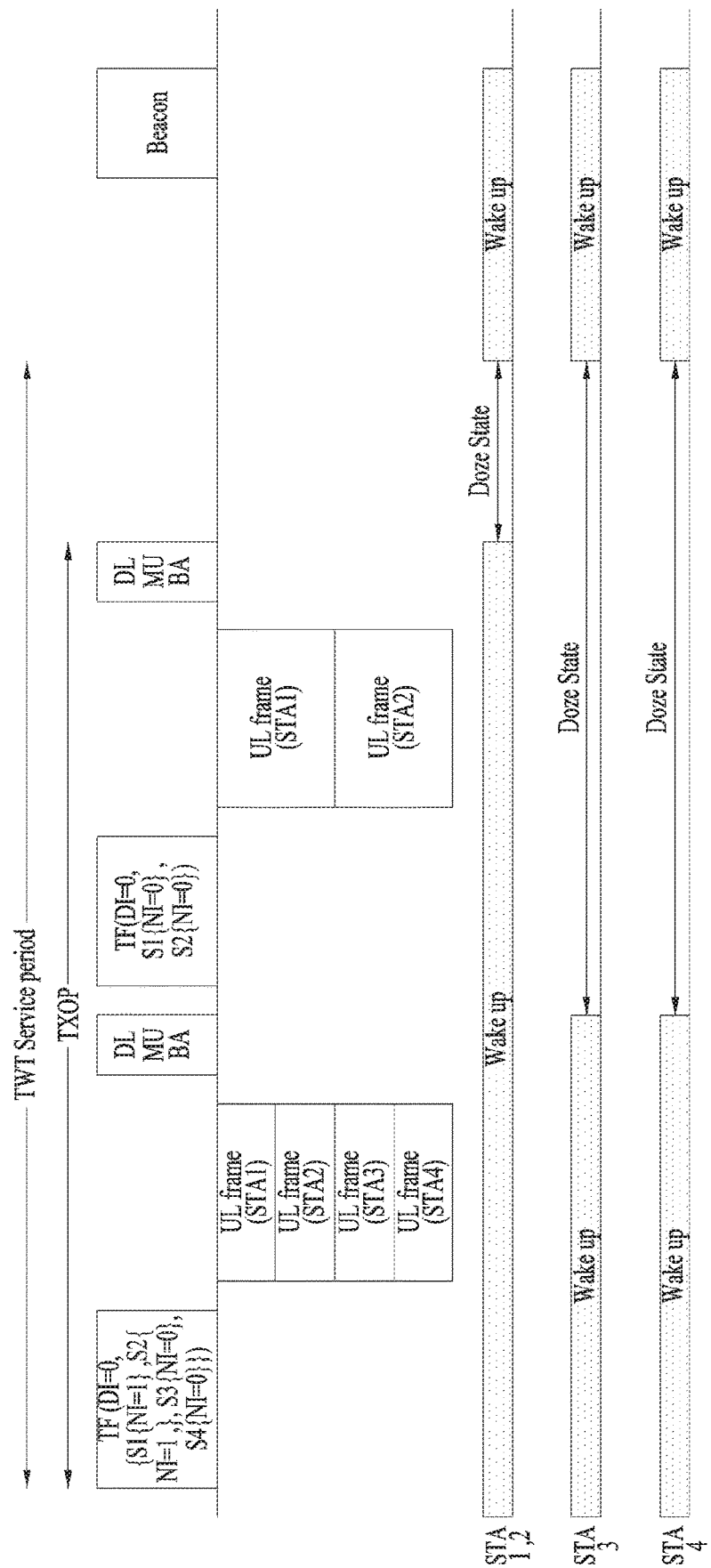
FIGS. 9 and 10 illustrate cases in which DI is included in TFs according to an embodiment of the present invention.
Figure 10:
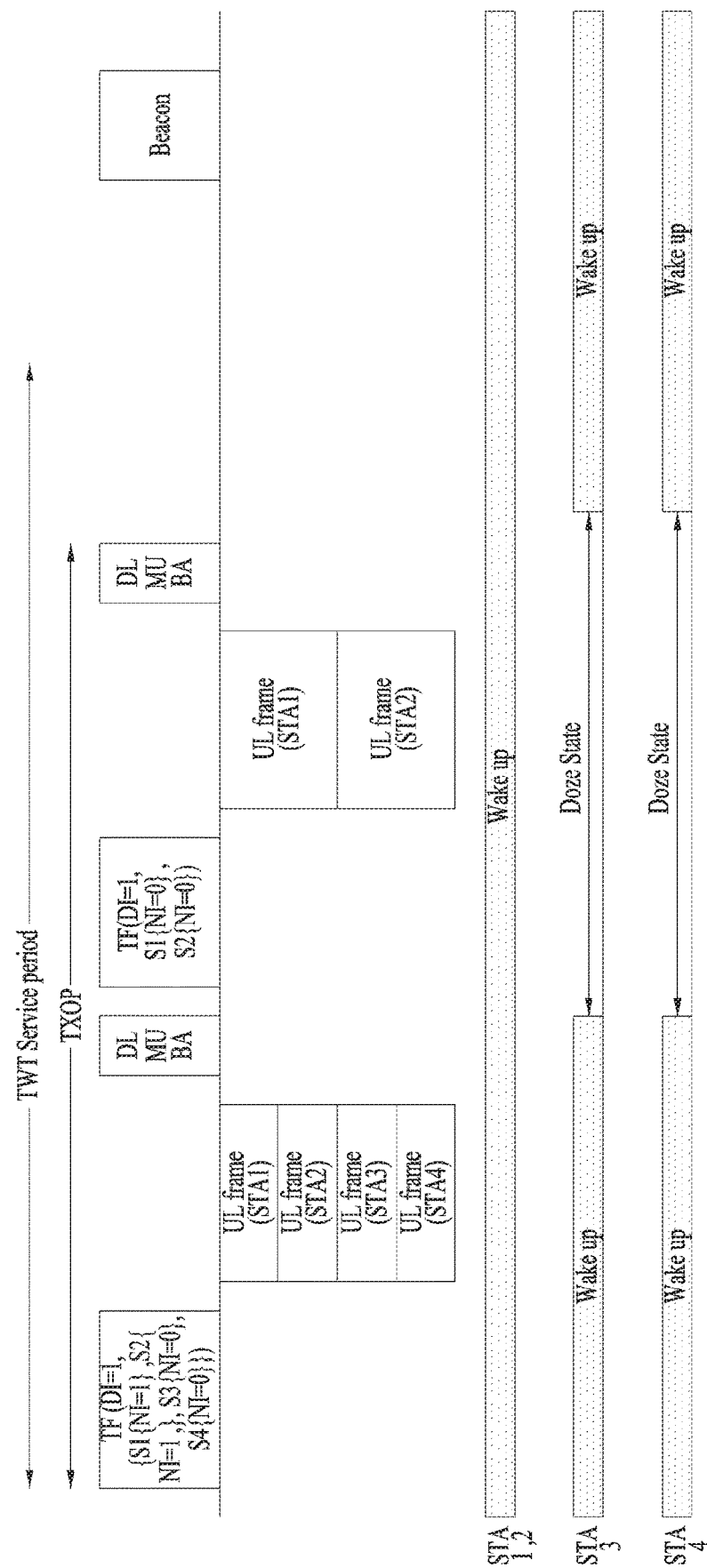

FIGS. 9 and 10 illustrate cases in which DI is included in TFs according to an embodiment of the present invention.

Specifically, FIG. 9 shows that the DI is set to 0 (DI=0) so that STAs enter and maintain the doze state until the TWT SP, and FIG. 10 shows that the DI is set to (DI=1) so that STAs enter and maintain the doze state until the end of the TXOP. In FIGS. 9 and 10, the same operation as the above-described embodiment is used to determining the doze state transition using NI.

The aforementioned DI can be implemented using 2-bit information as shown in Table 4 below.

TABLE 4

00: TWT SP based
01: TXOP based
10: Next TBTT based
11: reserved

In the above two example, the DI may be included in the Common Info field of the TF so that all STA can read the DI, or it may be included in the Common Info (i.e., Trigger-dependent Common Info) field of the TF corresponding to OFDMA random access so that only STAs performing the OFDM random access can read the DI.

In addition, the DI may be separately notified. For example, the DI may be transmitted, being included in the Per User Info field of the TF or the Trigger-dependent Per User Info field. In this example, the DI corresponds to one bit. Specifically, 0 indicates doze state operation based on a TWT SP, and 1 indicates doze state operation based on a TXOP.

Figure 11:
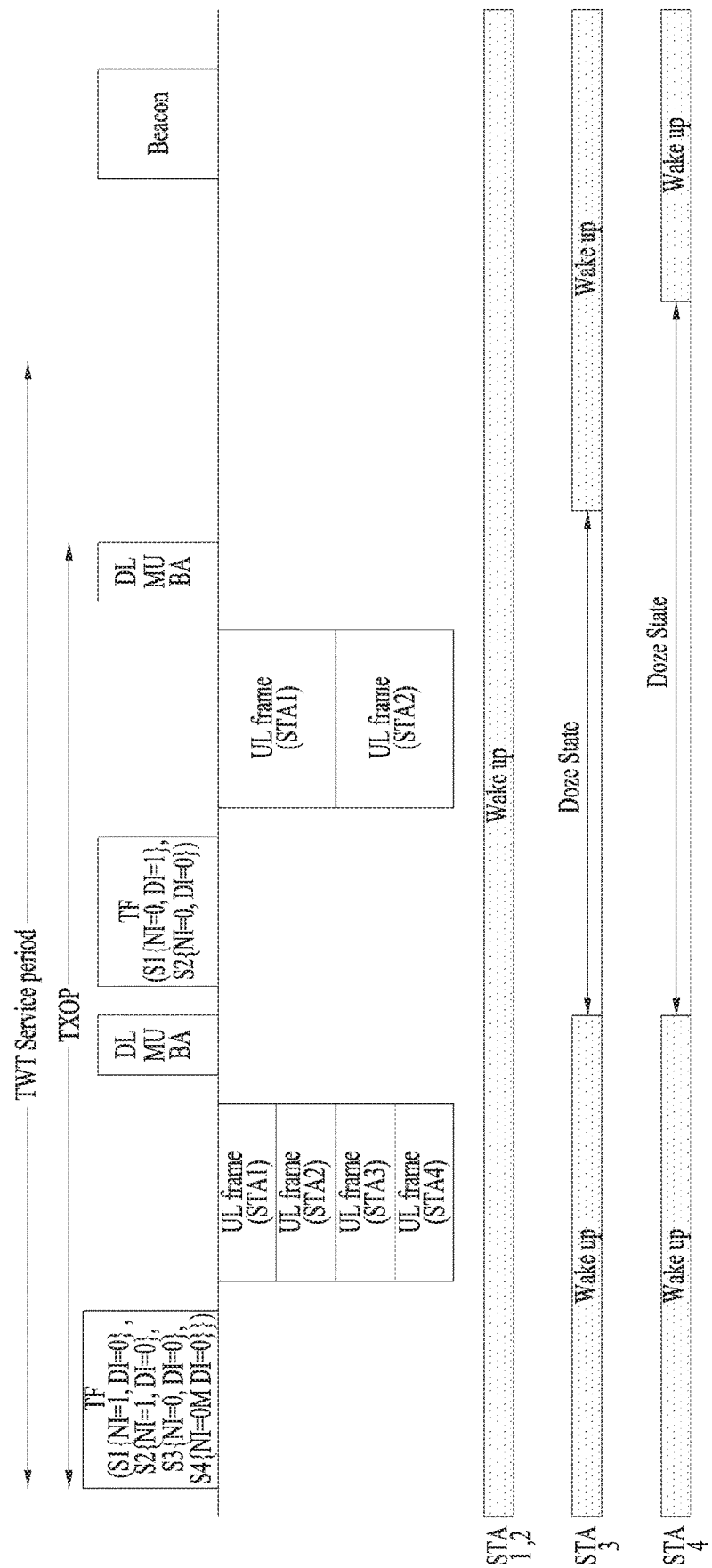
FIG. 11 illustrates an example of operating separately configured DI according to an embodiment of the present invention.

FIG. 11 illustrates an example of operating separately configured DI according to an embodiment of the present invention.

In the example of FIG. 11, since the DI of STA 3 is set to 1, STA 3 enters and maintains the doze state until the end of the corresponding TXOP. On the other hand, since the DI of STA 4 is set to 0, STA 4 enters and maintains the doze state until the end of the TWT SP.

In the above example, the DL MU BA and TF may be transmitted through one A-MPDU or one MPDU (i.e., in one control frame). The DL MU BA and TF may be transmitted at an interval of an SIFS or PIFS. Alternatively, after transmission of the DL MU BA, the TF may be transmitted based on EDCA.

In another embodiment of the present invention, the DI can be replaced with doze state time information indicating when and how long an STA should enter and maintain the doze state for. The corresponding information indicates the time when the STA wakes up from the doze state, and it may be represented as absolute or relative time information.

It is apparent that the term "Next Scheduling Indication" can be replaced with other terms in the present invention. For example, when the term "Next Scheduling Indication" is replaced with the term "No More Trigger" and a corresponding bit is set to 0, a corresponding STA maintains the awake state during TXOP or a TWT SP. On the contrary, when the corresponding bit is set to 1, the STA enters and maintains the doze state during the remaining TXOP period or TWT service period.

The Doze state type Indication (DI) can also be replaced with other terms. When the DI is replaced with the term "More Trigger" and a corresponding bit is set to 0, a corresponding STA enters and maintains the doze state during the remaining TXOP or TWT service period. On the contrary, if the corresponding field (bit) is set to 1, the STA may be configured to wait for reception of a next TF.

Operation Associated with Cascade Indication Field

The above-described operations and fields (e.g., No More Trigger/Next Scheduling Indication, Doze State Type Indication, etc.) can be defined and used through association with the Cascade Indication field included in the Common Info field.

When STAs are not scheduled by TFs, the STAs may perform the above-described operation using the Cascade Indication field included in the Common Info field. In other words, if the Cascade Indication field of the TF is set to 1, the corresponding STAs can maintain the awake state. On the contrary, if the Cascade Indication field is set to 0, the corresponding STAs can enter the doze state.

When STAs are scheduled by TFs, the STAs can enter and maintain the doze state during a predetermined time if the Cascade Indication field is set to 0. If the Cascade Indication field is set to 1, the scheduled STAs may operate using information in the above-described fields (e.g., No More Trigger/Next Scheduling Indication, Doze State Type Indication, etc.). For example, when the Cascade Indication field is set to 1 and when the No More Trigger field included in the Per User Info field is set to 1 (i.e., No More Trigger=1) (and/or NI=0), a scheduled STA enters the doze state. On the contrary, in the case of No More Trigger=0 (and/or NI=1), the scheduled STA maintains the awake state. In this case, the STA may maintain the doze state until the end of TWT Service period/TXOP/Next TBTT as described above.

In the case of OFDMA random access (i.e., when the AID of the Per User Info field is 0), the No More Trigger (and/or Next UL scheduling Indication and/or More Trigger) field may be used to reduce power consumption of unassociated STAs.

More DL Data Information

It is desirable that the above-described methods are configured to be applied only when there is no DL data transmitted from an AP. For example, when there is a DL data frame in response to UL transmission, an STA does not enter the doze state even in the case of No More Trigger=1.

However, in the case of No More Trigger=1 (or NI=0), an STA can enter the doze state if any one of the following options is satisfied.

Option 1: If an STA is allocated UL MU resources through a TF where No More Trigger for the corresponding STA is set to 1 (or NI=0), the STA transmits a UL MU frame on the allocated resources, enters the doze state at the end of DL MU BA, and then maintains the doze state until the end of the remaining TXOP or TWT SP, regardless of whether DL MU ACK/BA (e.g., M-BA) is successfully received or not.

Option 2: If an STA is allocated UL MU resources through a TF where No More Trigger for the corresponding STA is set to 1 (or NI=0), the STA transmits a UL MU frame on the allocated resources. Thereafter, if DL MU ACK/BA is correctly received (e.g., when DL OFDMA ACK/BA or an M-BA frame is correctly received or when the received M-BA frame contains ACK/BA information for the AID of the corresponding STA), the STA may enter the doze state. In this case, if the STA fails to receive the DL MU BA after transmitting the UL MU frame (HE trigger-based PPDU) (e.g., when the DL OFDMA ACK/BA or M-BA frame is successfully received or when the received M-BA frame contains the ACK/BA information for the AID of the corresponding STA), the STA maintains the awake state.

In summary, if More Trigger (No More Trigger or Next UL Scheduling) does not indicate that a next TF contains the trigger information for an HE STA (i.e., UL MU resource allocation information) (that is, if More Trigger=0), the HE STA may enter the doze state after receiving a response (ACK/BA) to UL MU transmission and maintain the doze state until the end of the remaining TWT SP or during the TXOP.

In this case, information indicating whether there is DL data to be transmitted to an STA may be included in a TF. For example, More DL Data information may be included in the Per User Info field. Thus, if an STA receives a TF with More Trigger set to 0, the STA may determine whether to enter the doze state based on the More DL Data information.

The More DL Data information can be determined according to one of the following rules.

(1) It indicates whether there is DL data to be transmitted to an STA.

(2) It indicates whether there is DL data to be transmitted to an STA during a configured TXOP or TWT SP. This could be interpreted as follows. Although the DL data to be transmitted to the corresponding STA is present, if it is not scheduled during the TWT SP, a corresponding field is set to 0. On the contrary, if it is scheduled during the TWT SP, the corresponding field is set to 1.

The More DL Data information can be transmitted through the Per User Info field of the TF, but it can also be transmitted through Multi-STA Block ACK (BA). For example, if an AP transmits ACK/BA for UL MU frame reception through Multi-STA BA, the AP may transmit More DL Data information for each STA by including it in the Multi-STA BA (for example, in the Per STA Information field of the Multi-STA BA, a specific field (e.g., the TID subfield of the Per AID Info field) may be defined using a specific value (e.g., 1111) or one bit). By doing so, upon receiving the Multi-STA BA, an STA may know whether the AP will transmits DL data. If there is no DL data, the SAT enters the doze state until the end of the remaining TWT SP or during the TXOP depending on situations.

If More Trigger and More DL Data are included in the Per User Info field of a TF, STAs indicated by User Identifier in the Per User Info field (or STAs for AID=0) may determine whether to enter the doze state during the remaining TXOP or TWT SP. For example, when both More Trigger and More DL Data are set to 0, the STAs can enter the doze state. In other words, if either More Trigger or More DL Data is set to 1, the corresponding STA(s) cannot enter the doze state. It can be equally applied when Multi-STA Block includes the More Trigger and More DL Data.

The More Trigger and More DL Data information can be defined as a single field. For example, the More Trigger and More DL Data information may be defined as a More DL/UL Resource Allocation (MRA) field or transmitted, being included in the Per User Info field.

If an AP has no DL data to be transmitted to an STA(s) during a TWT SP or TXOP and no longer transmits trigger information for UL resource allocation to the corresponding STA(s), the AP sets a corresponding field to 0. When the corresponding field is set to 0, the corresponding STA(s) performs UL MU transmission in response to a TF and then receives a response (ACK/BA) to the UL MU transmission. Thereafter, the corresponding STA(s) may enter the doze state until the end of the remaining TWT SP or during the TXOP. Similar to the above-described More Trigger or More DL Data field, the MRA field may be transmitted to each STA, being included in the Per STA Information field of Multi-STA BA. In this case, if the corresponding field is set to 0, the corresponding STA(s) enters the doze state until the end of the remaining TWT SP or during the TXOP.

Figures 12, 13:
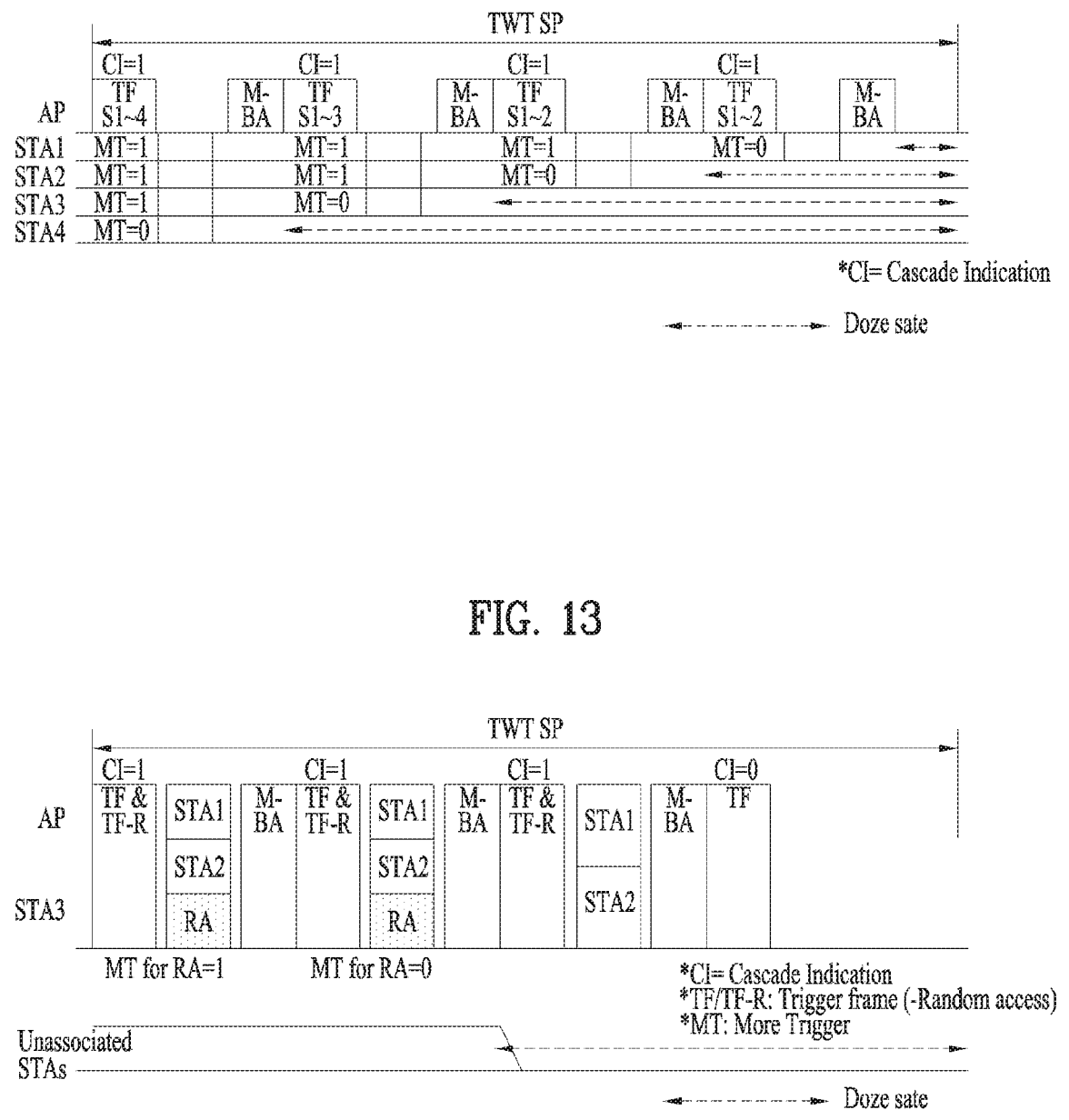

FIG. 12 is a diagram for explaining a method of using the More DL Data field according to an embodiment of the present invention.

Referring to the example of FIG. 12, since More Trigger (MT) of the first TF is set to 0, STA 4 transmits a UL MU frame, receives M-BA/DL MU BA, and then enters the doze state. In addition, since MT of the second TF is set to 0, STA 3 transmits a UL MU frame, receives M-BA/DL MU BA, and then enters the doze state. Moreover, since MT of the third TF is set to 0, STA 2 transmits a UL MU frame, receives M-BA/DL MU BA, and then enters the doze state. Further, since MT of the fourth TF is set to 0, STA 1 transmits a UL MU frame, receives M-BA/DL MU BA, and then enters the doze state.

If STAs fail to correctly receive DL MU ACK/BA or if ACK/BA information for the corresponding STAs is not included in received M-BA frames, the STAs maintain the awake state. The TF may include the above-described MRA field instead of MT. In addition, if the STAs know that the AP will transmit DL frames to the corresponding STAs (e.g., when the More Data fields of DL frames are set to 1), the STAs do not enter the doze state even if the above conditions are satisfied.

If the STAs do not need to receive ACK/BA after transmitting UL MU frames (i.e., if the ACK policy on UL MU frames is set as no ACK), the corresponding STAs may enter the doze state immediately after transmitting the UL MU frames.

If the STAs requires ACK/BA, the STAs may wait for the ACK until ACK timeout after transmitting UL MU frames. Thereafter, the STAs may enter the doze state. This corresponds to a case in which although the AP transmits DL MU ACK/BA, the STAs fail to correctly receive the ACK/BA due to the occurrence of errors. In addition, if the AP fails to correctly receive the UL MU frames, polling can be performed before ACK timeout.

The aforementioned method can be used to reduce power consumption of STAs that perform OFDMA random access only (e.g., unassociated STAs in cell edges) when the resource allocation for the OFDMA random access coexist with the UL MU resource allocation for scheduled STAs.

FIG. 13 is a diagram for explaining a power saving method for an unassociated STA according to an embodiment of the present invention.

Referring to the example of FIG. 13, in the first TF, the resource allocation for STAs 1 and 2 and the resource allocation for OFDMA random access (AID for Per User Info=0) is performed. In the case of STAs configured to perform only the OFDMA random access (e.g., unassociated STAs), the STAs attempt to perform the random access after receiving the first TF. However, since the More Trigger field for the random access of the first TF is set to 1, the STAs wait for a next TF. Upon receiving the second TF, the STAs perform the random access. In this case, the More Trigger field for the random access is set to 0, the STAs enter the doze state after completing the radon access (e.g., when the STAs receive DL MU ACK/BA or Multi-STA BA for random access UL transmission).

Figure 14:
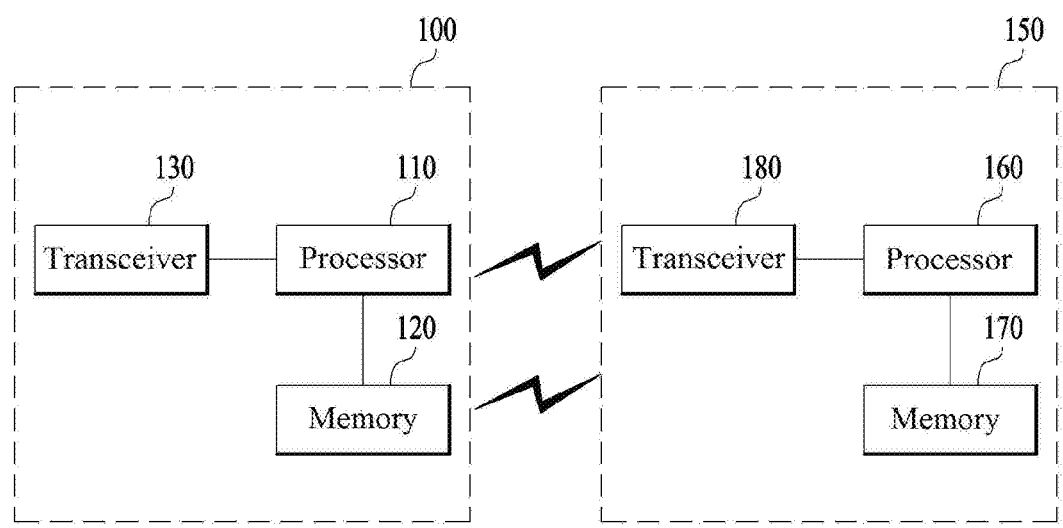
FIG. 14 is a block diagram for exemplary configurations of an AP (or base station) and an STA (or user equipment) according to one embodiment of the present invention.

FIG. 14 is a block diagram for exemplary configurations of an AP (or base station) and an STA (or user equipment) according to one embodiment of the present invention.

An AP 100 may include a processor 110, a memory 120, and a transceiver 130, and an STA 150 may include a processor 160, a memory 170, and a transceiver 180.

The transceiver 130/180 can transmit/receive a radio signal, and the physical layers according to the IEEE 802 system can be implemented therein. The processor 110/160 is connected to the transceiver 130/180, and physical layers and/or MAC layers according to the IEEE 802 system can be implemented therein. The processor 110/160 is configured to operate according to at least one of the various embodiments of the present invention. A module for implementing operations of the AP and STA according to the various embodiments of the present invention may be stored in the memory 120/170, and the module can be controlled by the processor 110/160. The memory 120/170 can be connected to the processor 110/160 by well-known means such that the memory 120/170 is included in the processor 110/160 or installed outside the processor 110/160.

The details of the AP 100 and STA 150 can be respectively applied to a base station and a user equipment in other wireless communication systems (e.g., LTE/LTE-A system).

The above-described configurations of the AP and STA may be applied such that the above-described embodiments can be independently implemented or two or more thereof can be simultaneously implemented. For clarity, redundant description will be omitted.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the embodiments described herein, but should be accorded the broadest scope consistent with the principles and novel features disclosed herein. It will be apparent that, although the preferred embodiments have been shown and described above, the present specification is not limited to the above-described specific embodiments, and various modifications and variations can be made by those skilled in the art to which the present invention pertains without departing from the gist of the appended claims. Thus, it is intended that the modifications and variations should not be understood independently of the technical spirit or prospect of the present specification.

In addition, this document describes both the product invention and method invention, and if necessary, the two inventions can be complementarily interpreted.

INDUSTRIAL APPLICABILITY

The aforementioned embodiments of the present invention can be applied to various wireless communication system including the IEEE 802.11 system.

What is claimed is:
1. A method for reducing power consumption by a first station (STA) in a mobile communication system, the method comprising:
receiving a first trigger frame from an Access Point (AP); and transmitting a Physical Protocol Data Unit (PPDU) in response to the first trigger frame to the AP using a multi-user scheme, wherein the first trigger frame includes (a) subsequent scheduling information per STA and comprising multiple bits, each bit of the multiple bits indicating whether a corresponding STA has subsequent scheduling or not, (b) a cascade indicator on whether there is a second trigger frame that follows the first trigger frame, the cascade indicator applied to all STAs that transmit PPDUs using the multi-user scheme, and (c) resource allocation information for Orthogonal Frequency Divisional Multiple Access (OFDMA) random access with a specific value of an Association Identifier (AID) field, wherein, based on the first STA being a STA using a scheduling based access and based on the cascade indicator indicating that there is no second trigger frame, the first STA transits to the doze state regardless of the subsequent scheduling information per STA, wherein, based on the first STA being the STA using the scheduling based access, the first STA further determines the subsequent scheduling information per STA based on a determination that the cascade indicator indicates that there is the second trigger frame, wherein, based on the first STA being the STA using the scheduling based access and based on the subsequent scheduling information per STA indicating that there is no subsequent scheduling for the first STA, the first STA transits to the doze state even if the cascade indicator indicates that the second trigger frame is present, and wherein, based on the first STA being a STA using the OFDMA random access, the first STA transmits the PPDU using the resource allocation information for OFDMA random access.

2. The method of claim 1, wherein when the cascade indicator indicates that there is no second trigger frame, the first STA transits to the doze state regardless of the subsequent scheduling information per STA.

3. The method of claim 1, wherein the first STA is an STA scheduled by the first trigger frame, and wherein an STA that is not scheduled by the first trigger frame operates according to the cascade indicator in the first trigger frame.

4. The method of claim 1, wherein the first trigger frame includes a Common Control field and a User-specific Control field, and wherein the subsequent scheduling information per STA is included in the User-specific Control field.

5. The method of claim 1, wherein the first trigger frame further includes information on a doze type indicator, and wherein the doze type indicator indicates whether the doze state transition based on the subsequent scheduling information per STA should be maintained until (1) the end of the corresponding TXOP; (2) the end of the corresponding TWT service period; or (3) the next TBTT.

6. The method of claim 5, wherein the information on the doze type indicator is included in a Common Control field or a User-specific Control field of the first trigger frame.

7. The method of claim 1, wherein the first STA transits to the doze state at the time of transmitting the PPDU regardless of whether an acknowledgement is received in response to the transmitted PPDU.

8. The method of claim 1, wherein the first trigger frame further includes a More Data field per STA, and wherein even when the subsequent scheduling information per STA indicates that there is no subsequent scheduling for the first STA, the first STA does not transit to the doze state if the More Data field indicates that there is downlink data to be transmitted to the first STA.

9. A method for supporting power saving of one or more stations (STAs) by an Access Point (AP) in a mobile communication system, the method comprising:

transmitting a first trigger frame to the STAs; and receiving Physical Protocol Data Units (PPDUs) in response to the first trigger frame from the STAs using a multi-user scheme, wherein the first trigger frame includes (a) subsequent scheduling information per STA and comprising multiple bits, each bit of the multiple bits indicating whether a corresponding STA has subsequent scheduling or not, (b) a cascade indicator on whether there is a second trigger frame that follows the first trigger frame, the cascade indicator applied to all STAs that transmit PPDUs using the multi-user scheme, and (c) resource allocation information for Orthogonal Frequency Divisional Multiple Access (OFDMA) random access with a specific value of an Association Identifier (AID) field, wherein, based on the first STA, among the STAs, being a STA using a scheduling based access and based on the cascade indicator indicating that there is no second trigger frame, the first STA transits to the doze state regardless of the subsequent scheduling information per STA, wherein the first STA further determines the subsequent scheduling information per STA based on a determination that the cascade indicator indicates that there is the second trigger frame, wherein, based on the subsequent scheduling information per STA indicating that there is no subsequent scheduling for the first STA, the first STA transits to the doze state even if the cascade indicator indicates that the second trigger frame is present, and wherein based on a second STA, among the STAs, being a STA using the OFDMA random access, the second STA transmits the PPDU using the resource allocation information for OFDMA random access.

10. A first station (STA) for performing a power saving operation in a mobile communication system, the first STA comprising:

a transceiver configured to receive a first trigger frame from an Access Point (AP); and a processor configured to process the first trigger frame and control the transceiver to transmit a Physical Protocol Data Unit (PPDU) in response to the first trigger frame to the AP using a multi-user scheme, wherein the first trigger frame includes (a) subsequent scheduling information per STA and comprising multiple bits, each bit of the multiple bits indicating whether a corresponding STA has subsequent scheduling or not, (b) a cascade indicator on whether there is a second trigger frame that follows the first trigger frame, the cascade indicator applied to all STAs that transmit PPDUs using the multi-user scheme, and (c) resource allocation information for Orthogonal Frequency Divisional Multiple Access (OFDMA) random access with a specific value of an Association Identifier (AID) field, wherein, based on the first STA being a STA using a scheduling based access and based on the cascade indicator indicating that there is no second trigger frame, the first STA transits to the doze state regardless of the subsequent scheduling information per STA, wherein, based on the first STA being the STA using the scheduling based access, the first STA further determines the subsequent scheduling information per STA based on a determination that the cascade indicator indicates that there is the second trigger frame, wherein, based on the first STA being the STA using the scheduling based access and based on the subsequent scheduling information per STA indicating that there is no subsequent scheduling for the first STA, the first STA transits to the doze state even if the cascade indicator indicates that the second trigger frame is present, and wherein, based on the first STA being a STA using the OFDMA random access, the first STA transmits the PPDU using the resource allocation information for OFDMA random access.

11. An Access Point (AP) for supporting power saving of one or more stations (STAs) in a mobile communication system, the AP comprising:

a transceiver configured to transmit a first trigger frame to the STAs and receive Physical Protocol Data Units (PPDUs) in response to the first trigger frame from the STAs using a multi-user scheme; and a processor configured to:

include (a) subsequent scheduling information per STA and comprising multiple bits, each bit of the multiple bits indicating whether a corresponding STA has subsequent scheduling or not, (b) a cascade indicator on whether there is a second trigger frame that follows the first trigger frame in the first trigger frame, the cascade indicator applied to all STAs that transmit PPDUs using the multi-user scheme, and (c) resource allocation information for Orthogonal Frequency Divisional Multiple Access (OFDMA) random access with a specific value of an Association Identifier (AID) field, wherein, based on the first STA, among the STAs, being a STA using a scheduling based access and based on the cascade indicator indicating that there is no second trigger frame, the first STA transits to the doze state regardless of the subsequent scheduling information per STA, wherein the first STA further determines the subsequent scheduling information per STA based on a determination that the cascade indicator indicates that there is the second trigger frame, wherein, based on the subsequent scheduling information per STA indicating that there is no subsequent scheduling for the first STA, the first STA transits to the doze state even if the cascade indicator indicates that the second trigger frame is present, and wherein based on a second STA, among the STAs, being a STA using the OFDMA random access, the second STA transmits the PPDU using the resource allocation information for OFDMA random access.

* * * * *